United States Patent [19]

Yamashita et al.

[11] Patent Number: 5,854,463
[45] Date of Patent: Dec. 29, 1998

[54] FLUX CORED WIRE FOR STAINLESS STEEL

[75] Inventors: Ken Yamashita; Tsuyoshi Kurokawa, both of Fujisawa, Japan

[73] Assignee: Kabushiki Kaisha Kobe Seiko Sho, Kobe, Japan

[21] Appl. No.: 808,651

[22] Filed: Feb. 28, 1997

[30] Foreign Application Priority Data

May 13, 1996 [JP] Japan .................................. 8-118030

[51] Int. Cl.$^6$ .................................................. B23K 35/24
[52] U.S. Cl. .................................. 219/145.22; 219/146.23
[58] Field of Search ........................ 219/145.22, 146.23, 219/137 WM

[56] References Cited

U.S. PATENT DOCUMENTS

| | | | |
|---|---|---|---|
| 5,219,425 | 6/1993 | Nishikawa et al. | 219/145.22 |
| 5,378,871 | 1/1995 | Nishikawa et al. | 219/145.22 |

*Primary Examiner*—Clifford C. Shaw
*Attorney, Agent, or Firm*—Oblon, Spivak, McClelland, Maier & Neustadt, P.C.

[57] ABSTRACT

Described is a flux cored wire for stainless steel which comprises a metal covering and flux filled inside of the metal covering. In the flux cored wire for stainless steel, the flux contains a slag forming agent in an amount of 6.0 wt. % to 13.0 wt. % based on the total weight of the wire and the metal covering is formed of an austenite-base stainless steel containing 0.003 wt. % to 0.090 wt. % of O, 0.0005 wt. % to 0.02 wt. % of S, 0.1 wt. % to 0.6 wt. % of Si and 0.005 wt. % to 0.2 wt. % of V, each based on the total weight of the metal covering.

5 Claims, 1 Drawing Sheet

FLUX CORED WIRE FOR STAINLESS STEEL

BACKGROUND OF THE INVENTION

1. Field of the Invention

This invention relates to a flux cored wire for stainless steel employed for semi-automatic welding or automatic welding, particularly to a flux cored wire for stainless steel which wire has a good rearc property.

2. Description of the Related Art

A flux cored wire for stainless steel has advantages that it has good arc stability, a production amount of spatters is small, and it has an excellent bead appearance, because an arc stabilizer, a slag forming agent and the like have been added to the flux. There is accordingly a rapid increase in the using amount of the flux cored wire for stainless steel. In addition, with an increasing demand for the efficiency enhancement and also for automation in the industrial fields, application of it to not only semi-automatic welding but also automatic welding by an automatic machine or welding robot is on increase.

The use of a conventional flux cored wire for stainless steel is however accompanied with the problem of inferiority in a rearc property (rearc starting property). Whether the rearc property is good or bad depends on the condition of the wire tip point contiguous to a base material. For example, when a wire tip point just cut by a cutting pliers or the like is brought into contact with a base material to be welded and then welding is performed, arc starting can be carried out smoothly without problems.

On the other hand, when there exists a substance which inhibits the flow of a welding current at the wire tip point, more specifically, when a spherical body (hereinafter called a "ball") formed at the wire tip point is covered with slag at the time when the welding is completed, this slag inhibits the flow of the welding current between the wire and the base material to be welded, which inevitably lowers a smooth arc staring property, that is, rearc property.

As described above, in a flux cored wire for stainless steel, a slag forming agent has been added to the flux filled inside of the metal covering so that the surface of the ball formed at the wire tip point at the time of completion of the welding is inevitably covered with slag. Due to the slag, the rearc property lowers, spatters are formed because of the instability of the arc at the arc starting time or a technique to prevent the formation of spatters becomes necessary, which results in the problem of a lowering in the working efficiency.

Also in automatic welding, deterioration in a rearc property causes a problem of lowering the productivity of the whole welding process, for example, it terminates a welding robot or a welding bead of a fixed length cannot be obtained.

SUMMARY OF THE INVENTION

In consideration of the above described problems, the present invention has been completed. An object of the present invention is to provide a flux cored wire for stainless steel which stably brings about good rearc property and in addition, which can improve the welding workability.

The present invention therefore provides a flux cored wire for stainless steel, which comprises a metal covering and flux filled inside of the metal covering. In the flux cored wire for stainless steel, the flux contains a slag forming agent in an amount of 6.0 wt. % to 13.0 wt. % based on the total weight of the wire and the metal covering is made of an austenite-base stainless steel containing 0.003 wt. % to 0.090 wt. % of O, 0.0005 wt. % to 0.02 wt. % of S, 0.1 wt. % to 0.6 wt. % of Si and 0.005 wt. % to 0.2 wt. % of V, each based on the total weight of the metal covering.

Incidentally, it is preferred that the metal covering contains 0.005 wt. % to 0.090 wt. % of O, 0.0010 wt. % to 0.02 wt. % of S, 0.15 wt. % to 0.45 wt. % of Si and 0.010 wt. % to 0.1 wt. % of V, each based on the total weight of the metal covering. In addition, it is preferred that the total amount of N and Nb which are inevitable impurities in the metal covering is controlled to 0.2 wt. % or smaller based on the total weight of the metal covering.

Furthermore, the slag forming agent can be at least one compound selected from the group consisting of metal oxides, metal fluorides, carbonates and silicic acid compounds.

The present inventors have carried out various experiments and studies on the influences of the shape of the ball formed at the wire tip point at the time of the completion of the welding and also behavior of the ball-covering slag on the arc starting property at the time of the subsequent welding, that is arc restarting property. As a result, it has been found that the smaller the ball at the wire tip point contiguous to the base material is and the thinner and evener the ball-covering slag is, the slag can be separated from the slag more easily and rearc property is improved. It has also been found that the more fragile and easier to break the ball-covering slag is, the better rearc property can be obtained stably.

Based on those findings, the present inventors have come to a conclusion that a good rearc property can be obtained stably by making the separation of the slag from the ball formed at the wire tip point easier and by making the ball-covering slag itself fragile and easy to break.

The present inventors have repeated extensive experiments and studies on the chemical components of the austenite-base stainless steel used as a metal covering and the composition of the flux filled inside of the metal covering. As a result, it has been found that a good rearc property can be obtained stably by satisfying the following conditions. First, the total weight of a slag forming agent in the flux is specified in order to make the thickness of the ball-covering slag uniform. Secondly, predetermined amounts of O, Si and S are incorporated in the metal covering in order to make the ball smaller and make the thickness of the ball-covering slag thinner. Thirdly, the Si content and S content in the metal covering are specified properly in order to make the separation of the ball-covering slag easier. Last, a predetermined amount of V is incorporated in the metal covering in order to make the ball-covering slag more fragile and easier to break.

The lack of any one of the above conditions not only prevents the provision of a flux cored wire having good rearc property but also exerts bad influences on the welding workability and the soundness of the deposited metal. Such effects which are not available under the incomplete conditions can be obtained by specifying the content of each of the specific components in the flux contained inside of the metal covering. Rather, the adjustment of the content of each of the specific components in the metal covering brings about marked effects. Accordingly, the content of each of the specific components in the metal covering is specified in the present invention. Incidentally, a still better rearc property can be obtained by controlling the total amount of N and Nb in the metal covering.

As described above, according to the present invention, the content of the slag forming agent in the flux is specified and the contents of O, S, Si and V in the metal covering are also specified so that a good rearc property can be obtained stably and a flux cored wire for stainless steel which permits improvement of the welding workability can be obtained. If the total amount of N and Nb in the metal covering is adjusted to less than a predetermined amount, a still more improvement is brought about for the rearc property.

DETAILED DESCRIPTION OF THE PREFERRED EMBODIMENTS

Figure 1A:
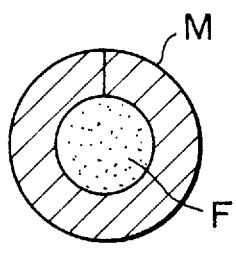
FIGS. 1(a)–1(d) are cross-sectional views illustrating examples of the shape of the flux cored wire for stainless steel according to the present invention.

The flux cored wire for stainless steel in the present invention will next be described in detail. First, the content of a slag forming agent in the flux based on the total weight of the wire will be described.

Slag forming agent: 6.0 wt. % to 13.0 wt. %

When the content of the slag forming agent in the flux is smaller than 6.0 wt. % based on the total weight of the wire, the ball formed at the wire tip point cannot be covered with slag of uniform thickness. When the content of the slag forming agent exceeds 13.0 wt. % and becomes excessive, on the other hand, the thickness of the ball-covering slag becomes uneven and it becomes remarkably thick in portion, resulting in a marked deterioration in a rearc property. During welding, there occurs a phenomenon that the slag precedes and covers a molten pool, which makes the arc unstable or causes welding defects such as slag inclusion or inferior fusion. Accordingly, the content of the slag forming agent in the flux is 6.0 wt. % to 13.0 wt. % based on the total weight of the wire.

Incidentally, examples of the slag forming agent contained in the flux include metal oxides such as $TiO_2$, $SiO_2$, $ZrO_2$ and $Al_2O_3$, metal fluorides such as NaF, $CaF_2$, $K_2SiF_6$, $AlF_3$ and $K_2ZrF_6$, carbonates such as $CaCO_3$, $BaCO_3$ and $Li_2CO_3$ and silicic acid compounds such as $K_2O.Al_2O_3.6SiO_2$ (potassium feldspar) and $Na_2O.Al_2O_3.6SiO_2$ (sodium feldspar).

The component of the slag forming agent in the flux is molten, forms slag and floats on the molten metal, thereby preventing the oxidation of the molten metal. In addition to such a slag forming agent for flux, there are alloy powder or metal powder (ex. Fe—Cr, Ni or Mo) for the adjustment of the component of the deposited metal, various carbides, nitrides and sulfides (ex. Cr—C, Cr—N or Fe—S), deoxidizers (Fe—Si, Fe—Mn, Fe—Al or Fe—Ti) and iron powder. The slag forming agent can be clearly distinguished from the above ones from the viewpoint of the existence of shielding action on the molten metal.

A description will next be made of the reason why the content of each of the components in the metal covering is specified based on the total weight of the metal covering.

O: 0.003 wt. % to 0.090 wt. %

The oxygen (O) in the metal covering is effective for lowering the surface tension of the molten metal at the tip point of the wire, thereby decreasing the size of the ball formed, and at the same time, for improving the affinity of the ball with the slag, thereby thinning the slag which covers the surface of the ball. When the oxygen content in the metal covering is smaller than 0.003 wt. % based on the total weight of the metal covering, such effects are not available.

When the content of the oxygen in the metal covering exceeds 0.090 wt. % and becomes excessive, the ball-covering slag causes sagging, which makes the thickness of the slag uneven, thereby deteriorating the releasability of the slag and lowers the rearc property. When an excess amount of oxygen is contained in the metal covering, it reacts with c which also exists in the metal covering and becomes a cause for spatters. Therefore, such an excess amount is not preferred. Accordingly, the content of O in the metal covering is 0.003 wt. % to 0.090 wt. % based on the total weight of the metal covering, with 0.005 wt. % to 0.090 wt. % being more preferred.

Examples of the means to adjust the content of oxygen in the metal covering to a predetermined amount includes adjustment of the deoxidizer at the time when the metal covering is produced, positive oxidation of the surface of the metal covering at the time when the wire is produced, and pressing of a metal oxide against either one or both of the internal surface and external surface of the metal covering to embed the former in the latter.

S: 0.0005 wt. % to 0.02 wt. %

Sulfur (S) in the metal covering has the same action with that of oxygen. Described specifically, sulfur is effective for decreasing the size of the ball formed at the tip point of the wire and improving the affinity of the ball with the slag, thereby forming thin slag. In addition, it has effects for weakening the bonding power between the ball and slag and facilitating the release of the slag. When the content of S in the metal covering is smaller than 0.0005 wt. % based on the total weight of the metal covering, such effects are not available. When the content of S in the metal covering exceeds 0.02 wt. % and becomes excessive, on the other hand, the ball-covering slag causes sagging, which makes the thickness of the slag uneven, thereby deteriorating the releasability of the slag and lowering the rearc property. Addition of S to the metal covering in an excess amount lowers the crack resistance of the welding metal so that it is not preferred. Accordingly, the content of S in the metal covering is 0.0005 wt. % to 0.002 wt. % based on the total weight of the metal covering, with 0.0010 wt. % to 0.02 wt. % being more preferred.

Si: 0.1 wt. % to 0.6 wt. %

Silicon (Si) in the metal covering is effective for lowering the viscosity of the molten metal at the wire tip point, thereby diminishing the size of the ball formed. When the content of Si in the metal covering is smaller than 0.1 wt. % based on the total weight of the metal covering, such an effect cannot be obtained. When the content of Si in the metal covering exceeds 0.6 wt. % and becomes excessive, on the other hand, the releasability of the ball-covering slag is deteriorated, resulting in the lowering in the rearc property. In addition, when an excess amount of Si is added to the metal covering, reduction in the viscosity of the molten metal occurs excessively, whereby the bead shape becomes convex in the case where the welding is carried out in a welding position such as vertical welding. Accordingly, the content of Si in the metal covering is 0.1 wt. % to 0.6 wt. % based on the total weight of the metal covering. Incidentally, it is preferred that the content of Si in the metal covering is 0.15 wt. % to 0.45 wt. %, with 0.15 wt. % to 0.35 wt. % being more preferred.

V: 0.005 wt. % to 0.2 wt. %

Vanadium (V) in the metal covering is effective for making the ball-covering slag fragile and easy to break. Such an effect is considered to be brought about because V is mixed in the ball-covering slag and forms double oxides of a low melting point, thereby weakening the bonding power of the slag itself. When the content of V in the metal covering is smaller than 0.005 wt. % based on the total weight of the metal covering, the above effect cannot be obtained. When the content of V in the metal covering exceeds 0.2 wt. %, on the other hand, there appears a partial seizing phenomenon of the ball-covering slag, whereby a good rearc property cannot be obtained. Accordingly, the content of V in the metal covering is 0.005 wt. % to 0.2 wt. % based on the total weight of the metal covering. It is preferred that the content of V in the metal covering is 0.010 wt. % to 0.1 wt. %.

Total content of N and Nb: 0.2 wt. % or smaller

As described above, when each of the contents of O, S, Si and V in the metal covering satisfies the range specified by the present invention, a good rearc property can be obtained stably. If any one of them is outside the range specified by the present invention, the rearc property becomes inferior. On the other hand, N and Nb which are inevitable impurities in the metal covering deteriorate the releasability of the ball-covering slag, thereby lowering the rearc property. So, if the total amount of the N and Nb is adjusted to less than a predetermine amount, a still better rearc property can be obtained. When the total content of N and Nb in the metal covering exceeds 0.2 wt. %, the releasability of the ball-covering slag lowers so that a good rearc property is not always available. Accordingly, it is preferred that the total content of N and Nb in the metal covering is 0.2 wt. % or smaller based on the total weight of the metal covering.

No particular limitation is imposed on the components in the metal casing and flux components other than the above-described chemical components. In other words, in order to improve the content of the each of the chemical components of the deposited metal and mechanical performances thereof or in order to heighten the stability of arc and to reduce the generation of spatters, it is possible to adjust the components and their contents as desired. No particular limitation is imposed on the filling ratio of flux but it is suited that the filling ratio of the flux falls within a range of from 15 wt. % to 30 wt. % in consideration of the disconnection troubles occurring at the time of wire production.

Although the flux cored wire has various cross-sectional shapes, there is no particular limitation imposed on it in the present invention. Concerning a wire, it is possible to select a wire from those having various diameters such as 0.8 mm, 0.9 mm, 1.0 mm, 1.2 mm and 1.6 mm. In addition, when welding is carried out using a flux cored wire of the present invention, a shielding gas such as $CO_2$ gas or $Ar/CO_2$ mixed gas can be used.

The present invention will next be described more specifically by comparing the examples of a flux cored wire for stainless steel of the present invention with comparative examples.

In each of the examples, a metal covering composed of an austenite-base stainless steel having a composition as shown in the below-described Tables 1–4 was produced and then flux was filled inside of the metal covering, whereby a flux cored wire was produced. The content of the slag forming agent in the flux based on the total weight of the wire is also shown in Table 1.

TABLE 1

| | No. | Slag forming agent in flux (wt. %) | Contents of chemical components in metal covering (wt.%) | | | | | |
|---|---|---|---|---|---|---|---|---|
| | | | O | S | Si | V | N and Nb | C |
| Examples | 1 | 6.3 | 0.030 | 0.010 | 0.38 | 0.02 | 0.08 | 0.014 |
| | 2 | 12.8 | 0.024 | 0.002 | 0.35 | 0.03 | 0.03 | 0.017 |
| | 3 | 11.0 | 0.004 | 0.003 | 0.43 | 0.10 | 0.02 | 0.016 |
| | 4 | 8.3 | 0.088 | 0.015 | 0.55 | 0.08 | 0.02 | 0.014 |
| | 5 | 7.7 | 0.008 | 0.0008 | 0.41 | 0.07 | 0.10 | 0.008 |
| | 6 | 6.9 | 0.010 | 0.018 | 0.39 | 0.02 | 0.15 | 0.009 |
| | 7 | 10.5 | 0.010 | 0.013 | 0.18 | 0.02 | 0.02 | 0.009 |
| | 8 | 11.2 | 0.007 | 0.007 | 0.58 | 0.02 | 0.19 | 0.013 |
| | 9 | 6.9 | 0.068 | 0.009 | 0.38 | 0.18 | 0.02 | 0.012 |
| | 10 | 7.9 | 0.049 | 0.008 | 0.42 | 0.04 | 0.25 | 0.010 |
| | 11 | 8.9 | 0.015 | 0.012 | 0.44 | 0.03 | 0.02 | 0.015 |
| | 12 | 12.5 | 0.050 | 0.003 | 0.45 | 0.02 | 0.24 | 0.009 |
| | 13 | 12.5 | 0.065 | 0.002 | 0.54 | 0.02 | 0.02 | 0.005 |
| | 14 | 12.6 | 0.058 | 0.002 | 0.38 | 0.05 | 0.02 | 0.009 |
| | 15 | 7.7 | 0.055 | 0.012 | 0.36 | 0.02 | 0.03 | 0.011 |
| | 16 | 11.8 | 0.071 | 0.003 | 0.45 | 0.03 | 0.03 | 0.013 |
| | 17 | 11.9 | 0.035 | 0.010 | 0.49 | 0.05 | 0.03 | 0.016 |
| | 18 | 12.7 | 0.029 | 0.005 | 0.45 | 0.09 | 0.02 | 0.016 |
| | 19 | 12.6 | 0.008 | 0.005 | 0.45 | 0.05 | 0.25 | 0.018 |
| | 20 | 11.8 | 0.009 | 0.003 | 0.57 | 0.09 | 0.03 | 0.017 |
| | 21 | 7.5 | 0.038 | 0.008 | 0.39 | 0.02 | 0.23 | 0.010 |

TABLE 2

| | No. | Contents of chemical components in metal covering (wt. %) | | | | | | |
|---|---|---|---|---|---|---|---|---|
| | | Mn | P | Cu | Ni | Cr | Mo | Al | Ti |
| Examples | 1 | 1.05 | 0.022 | 0.18 | 9.99 | 18.26 | 0.078 | 0.002 | 0.003 |
| | 2 | 1.07 | 0.025 | 0.18 | 10.03 | 18.62 | 0.080 | 0.002 | 0.007 |
| | 3 | 1.08 | 0.023 | 0.16 | 9.80 | 18.38 | 0.080 | 0.003 | 0.006 |
| | 4 | 1.02 | 0.019 | 0.17 | 9.65 | 18.55 | 0.079 | 0.003 | 0.005 |
| | 5 | 1.11 | 0.022 | 0.11 | 9.94 | 19.29 | 0.020 | 0.003 | 0.009 |
| | 6 | 1.15 | 0.022 | 0.09 | 10.0 | 18.31 | 0.030 | 0.004 | 0.005 |
| | 7 | 1.02 | 0.025 | 0.09 | 10.03 | 18.95 | 0.300 | 0.005 | 0.006 |
| | 8 | 1.10 | 0.023 | 0.09 | 10.05 | 18.97 | 0.210 | 0.003 | 0.006 |
| | 9 | 1.10 | 0.023 | 0.11 | 10.06 | 18.96 | 0.290 | 0.003 | 0.006 |
| | 10 | 1.18 | 0.021 | 0.12 | 10.03 | 18.88 | 0.028 | 0.003 | 0.008 |
| | 11 | 1.12 | 0.021 | 0.09 | 9.99 | 18.99 | 0.056 | 0.003 | 0.009 |
| | 12 | 1.11 | 0.020 | 0.09 | 9.89 | 18.97 | 0.056 | 0.003 | 0.006 |
| | 13 | 1.03 | 0.019 | 0.10 | 10.06 | 18.97 | 0.084 | 0.003 | 0.009 |
| | 14 | 1.09 | 0.018 | 0.10 | 10.03 | 18.84 | 0.090 | 0.003 | 0.006 |
| | 15 | 1.18 | 0.019 | 0.11 | 9.99 | 18.78 | 0.090 | 0.003 | 0.009 |
| | 16 | 1.10 | 0.021 | 0.11 | 9.79 | 18.90 | 0.075 | 0.003 | 0.006 |
| | 17 | 1.10 | 0.023 | 0.08 | 9.89 | 19.02 | 0.150 | 0.003 | 0.006 |
| | 18 | 1.11 | 0.025 | 0.08 | 10.01 | 18.05 | 0.180 | 0.003 | 0.008 |
| | 19 | 1.16 | 0.021 | 0.05 | 10.20 | 18.72 | 0.170 | 0.003 | 0.006 |
| | 20 | 1.12 | 0.021 | 0.05 | 10.03 | 18.92 | 0.170 | 0.003 | 0.006 |
| | 21 | 1.02 | 0.023 | 0.24 | 10.00 | 18.67 | 0.170 | 0.003 | 0.006 |

TABLE 3

|  | No. | Slag forming agent in flux (wt. %) | Contents of chemical components in metal covering (wt. %) | | | | | |
|---|---|---|---|---|---|---|---|---|
|  |  |  | O | S | Si | V | N and Nb | C |
| Comparative Examples | 22 | 5.4 | 0.025 | 0.007 | 0.45 | 0.14 | 0.02 | 0.010 |
|  | 23 | 13.5 | 0.016 | 0.001 | 0.39 | 0.16 | 0.02 | 0.008 |
|  | 24 | 7.5 | 0.001 | 0.010 | 0.51 | 0.07 | 0.03 | 0.016 |
|  | 25 | 8.3 | 0.092 | 0.013 | 0.19 | 0.08 | 0.02 | 0.015 |
|  | 26 | 6.9 | 0.055 | 0.0002 | 0.48 | 0.01 | 0.07 | 0.015 |
|  | 27 | 7.3 | 0.032 | 0.035 | 0.54 | 0.03 | 0.15 | 0.012 |
|  | 28 | 12.4 | 0.064 | 0.0009 | 0.03 | 0.08 | 0.12 | 0.012 |
|  | 29 | 11.8 | 0.048 | 0.018 | 0.66 | 0.05 | 0.06 | 0.011 |
|  | 30 | 7.9 | 0.032 | 0.001 | 0.55 | 0.003 | 0.01 | 0.013 |
|  | 31 | 10.2 | 0.009 | 0.004 | 0.27 | 0.34 | 0.05 | 0.010 |
|  | 32 | 9.8 | 0.092 | 0.926 | 0.33 | 0.01 | 0.02 | 0.007 |
|  | 33 | 7.4 | 0.093 | 0.002 | 0.04 | 0.01 | 0.02 | 0.009 |
|  | 34 | 6.8 | 0.004 | 0.002 | 0.03 | 0.28 | 0.02 | 0.010 |
|  | 35 | 7.5 | 0.005 | 0.025 | 0.43 | 0.25 | 0.02 | 0.014 |
|  | 36 | 9.3 | 0.092 | 0.002 | 0.52 | 0.26 | 0.02 | 0.015 |
|  | 37 | 8.0 | 0.060 | 0.0003 | 0.67 | 0.02 | 0.05 | 0.011 |
|  | 38 | 9.5 | 0.001 | 0.0003 | 0.04 | 0.01 | 0.05 | 0.015 |
|  | 39 | 5.3 | 0.093 | 0.013 | 0.53 | 0.002 | 0.13 | 0.008 |
|  | 40 | 13.5 | 0.065 | 0.027 | 0.57 | 0.02 | 0.02 | 0.007 |
|  | 41 | 14.2 | 0.035 | 0.014 | 0.70 | 0.07 | 0.03 | 0.013 |
|  | 42 | 5.5 | 0.030 | 0.014 | 0.55 | 0.26 | 0.15 | 0.016 |

TABLE 4

|  | No. | Contents of chemical components in metal covering (wt. %) | | | | | | | |
|---|---|---|---|---|---|---|---|---|---|
|  |  | Mn | P | Cu | Ni | Cr | Mo | Ai | Ti |
| Comparative Examples | 22 | 1.18 | 0.014 | 0.18 | 10.08 | 19.17 | 0.210 | 0.002 | 0.005 |
|  | 23 | 1.19 | 0.017 | 0.18 | 13.48 | 23.20 | 0.014 | 0.003 | 0.005 |
|  | 24 | 1.15 | 0.020 | 0.17 | 9.94 | 18.85 | 0.034 | 0.002 | 0.004 |
|  | 25 | 1.21 | 0.021 | 0.17 | 9.80 | 18.75 | 0.036 | 0.002 | 0.004 |
|  | 26 | 1.17 | 0.021 | 0.12 | 9.93 | 19.36 | 0.036 | 0.002 | 0.006 |
|  | 27 | 1.20 | 0.021 | 0.09 | 11.90 | 17.85 | 2.300 | 0.003 | 0.006 |
|  | 28 | 1.29 | 0.020 | 0.09 | 9.90 | 18.93 | 0.030 | 0.004 | 0.007 |
|  | 29 | 1.21 | 0.017 | 0.12 | 9.77 | 18.89 | 0.024 | 0.004 | 0.005 |
|  | 30 | 1.25 | 0.019 | 0.08 | 10.44 | 18.85 | 0.066 | 0.003 | 0.004 |
|  | 31 | 1.26 | 0.019 | 0.09 | 10.54 | 19.17 | 0.063 | 0.003 | 0.006 |
|  | 32 | 1.15 | 0.021 | 0.09 | 9.85 | 19.35 | 0.012 | 0.002 | 0.006 |
|  | 33 | 1.09 | 0.018 | 0.09 | 9.95 | 19.04 | 0.019 | 0.002 | 0.006 |
|  | 34 | 1.16 | 0.020 | 0.10 | 10.01 | 19.02 | 0.019 | 0.002 | 0.006 |
|  | 35 | 1.19 | 0.020 | 0.08 | 9.94 | 19.02 | 0.018 | 0.002 | 0.006 |
|  | 36 | 1.18 | 0.025 | 0.06 | 10.00 | 19.45 | 0.010 | 0.002 | 0.007 |
|  | 37 | 1.12 | 0.027 | 0.09 | 9.93 | 19.39 | 0.012 | 0.006 | 0.006 |
|  | 38 | 1.00 | 0.022 | 0.09 | 9.94 | 19.01 | 0.410 | 0.002 | 0.006 |
|  | 39 | 1.09 | 0.025 | 0.12 | 9.87 | 19.41 | 0.170 | 0.005 | 0.005 |
|  | 40 | 1.11 | 0.020 | 0.15 | 9.79 | 19.30 | 0.200 | 0.002 | 0.005 |
|  | 41 | 1.18 | 0.021 | 0.16 | 9.81 | 19.25 | 0.140 | 0.002 | 0.004 |
|  | 42 | 1.07 | 0.022 | 0.18 | 9.84 | 19.50 | 0.050 | 0.007 | 0.003 |

FIG. 1 is a cross-sectional view illustrating the shape of a flux cored wire for stainless steel according to the present invention. FIG. 1(a) is a shape of the flux cored wire formed by, while filling flux F inside of the metal covering M which is in the form of a band plate, bending the metal covering to a tubular form so that the both ends of the metal covering M butt each other and then drawing the resulting wire to a predetermined diameter. The wire so obtained has a flat end face. FIG. 1(b) illustrates a wire having a curved end face. FIG. 1(c) illustrates a wire in which each of the butt ends has been bent to an L form to widen the butt end face. FIG. 1(d) is a wire having flux F filled inside of the seamless metal covering M.

Figure 1B:
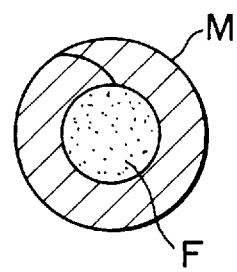
Figure 1C:
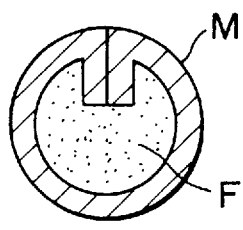
Figure 1D:
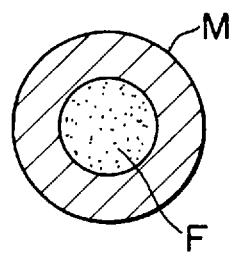

In examples of the present invention, a flux cored wire having the cross-sectional shape of FIG. 1(b), having been filled with flux at a flux filling ratio of 20 wt. % to 25 wt. %, and having a diameter of 1.2 mm was produced. By welding using the flux cored wire so obtained, tests on rearc property, welding workability and evaluation of welding defects were carried out.

A description will next be made of the testing method and evaluation standards of the rearc test. First, a tip point of the wire was cut by a cutting pliers and then the just cut surface of the tip point of the wire was brought into contact with a base material to generate arc, whereby a first bead having a bead length of 50 mm is welded on the base material. Then, the ball formed at the wire tip point at the time of the completion of the welding was retained for 15 minutes, followed by welding of a second bead having a bead length of 50 mm on the base material. On and after the third bead, welding was performed in a similar manner to that for the second bead, whereby 51 test beads were subjected to intermittent welding. The rearc property was evaluated as follows: the number of the failure in arc start not greater than 5 times was ranked as A (excellent), the number ranging from 6 times to 10 times was ranked as B (good), that ranging from 11 times to 15 times was ranked as C (passable) and that not smaller than 16 times was ranked D (inferior).

Concerning the welding workability, the generation state of spatters and the bead form were subjected to functional evaluation and the wire of good evaluation was ranked as A and that of inferior evaluation was ranked as B.

A description will next be made of the method for the evaluation test and evaluation standards of welding defects. The welding defects are evaluated, in accordance with JIS Z 3106, by carrying out a radiation permeation test at the welded part of the stainless steel.

Figure 2:
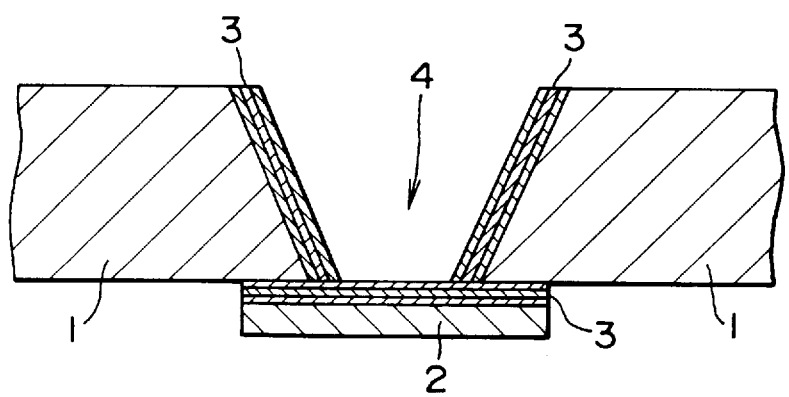
FIG. 2 is a cross-sectional view illustrating the included shape of a test plate for the radiation permeability.

FIG. 2 is a cross-sectional view illustrating an included form of a test plate for the radiation permeation test. As shown in FIG. 2, two base materials 1 for welding are cut to form slanted end surfaces and they are disposed a little apart each other so that a V-shaped included portion 4 which becomes progressively wider toward the upper end is formed. At the bottom part of the included portion 4, a backing metal 2 is disposed. The surfaces of the welding base materials 1 and backing metal 2 are subjected to three-layered buttering treatment using a flux cored wire for welding, whereby a welding metal 3 formed of three layers is formed.

In the examples of the present invention, the welding metal was formed at the included portion 4 with the clearance at the bottom of the welding base material 1 being 12 mm, the plate thickness being 20 mm and the included angle being 45°. Concerning welding defects, the wire which was not recognized to have slag inclusion, inferior fusion and cracks as the result of the radiation permeation test was ranked as A (good) and that which was recognized to have slag inclusion, inferior fusion and cracks was ranked as B (inferior).

The welding conditions in the above three evaluation tests are shown in Table 5, while the evaluation results are shown in Tables 6 and 7.

TABLE 5

| | Welding conditions | | |
|---|---|---|---|
| | Test on Rearc property | Test on welding workability | Evaluation test of welding defects |
| Welding current | 200 A | 150–250 A (standard: 200A) | 200 A |
| Welding voltage | 30 V | 26-32 V (Standard: 28–32 V) | 29 V |
| Welding rate | 30 cm/min automatic welding by welding robot | about 30 cm/min semi-automatic welding | about 30 cm/min semi-automatic welding |
| Welding position | downward | horizontal fillet and vertical | downward |
| Base material provided for the test | SUS 304 (board thickness 20 mm) | SUS 304 (board thickness 6 mm) | Mild steel (board thickness: 20 mm, welding length: 300 mm) |
| Distance between and base material | 20 mm | about 20 mm | About 20 mm |

TABLE 5-continued

| | Welding conditions | | |
|---|---|---|---|
| | Test on Rearc property | Test on welding workability | Evaluation test of welding defects |
| Welding procedure | — | — | 5 layers 10 passes |
| Composition and flow rate of shielding gas | 100% $CO_2$ gas and 80% Ar + 20% $CO_2$ mixed gas 25 liter/min | | |

TABLE 6

| | | Welding workability | | | |
|---|---|---|---|---|---|
| | No. | Rearc property (arc starting property) | Generation state of spatters | Bead form | Welding defects |
| Examples | 1 | A | A | A | A |
| | 2 | A | A | A | A |
| | 3 | B | A | A | A |
| | 4 | B | A | A | A |
| | 5 | B | A | A | A |
| | 6 | A | A | A | A |
| | 7 | A | A | A | A |
| | 8 | B | A | A | A |
| | 9 | A | A | A | A |
| | 10 | B | A | A | A |
| | 11 | A | A | A | A |
| | 12 | B | A | A | A |
| | 13 | B | A | A | A |
| | 14 | A | A | A | A |
| | 15 | A | A | A | A |
| | 16 | A | A | A | A |
| | 17 | B | A | A | A |
| | 18 | A | A | A | A |
| | 19 | B | A | A | A |
| | 20 | B | A | A | A |
| | 21 | B | A | A | A |

TABLE 7

| | | Welding workability | | | |
|---|---|---|---|---|---|
| | No. | Rearc property | Generation state of spatters | Bead form | Welding defects |
| Comparative Examples | 22 | D | A | A | A |
| | 23 | D | A | A | B |
| | 24 | D | A | A | A |
| | 25 | D | B | A | A |
| | 26 | D | A | A | A |
| | 27 | D | A | A | B |
| | 28 | D | A | A | A |
| | 29 | D | A | B | A |
| | 30 | D | A | A | A |
| | 31 | D | A | A | A |
| | 32 | D | B | A | B |
| | 33 | D | B | A | A |
| | 34 | D | A | A | A |
| | 35 | D | A | A | B |
| | 36 | D | B | A | A |
| | 37 | D | A | B | A |
| | 38 | D | A | A | A |
| | 39 | D | B | A | A |
| | 40 | D | A | A | B |
| | 41 | D | A | B | B |
| | 42 | D | A | A | A |

As shown in Tables 4, 6 and 7, in the flux cored wires of Examples No. 1 to No. 21, the content of the slag forming agent in the flux and contents of the components in the metal covering each falls within the range of the present invention so that the rearc property was good and evaluation results of the welding workability and welding defects were excellent. In particular, the components in the metal covering of the flux cored wire in each of Examples No. 1, 2, 3, 7, 9, 11, 14, 16 and 19 satisfy the preferred range and in addition, the total amount of N and Nb were controlled so that the rearc property was still better.

On the other hand, the flux cored wire in each of Comparative Examples Nos. 22 to 24 had inferior arc starting property. Particularly, the slag forming agent content of each of the flux cored wires in Comparative Examples Nos. 23, 40 and 41 exceeds the upper limit of the range of the present invention so that there occurred slag inclusion and inferior fusion, while the S content of the metal covering of each of the flux cored wires in Comparative Examples Nos. 27, 32, 35 and 40 exceeds the upper limit of the range of the present invention so that there occurred cracks in the welding metal. Accordingly, evaluation results of the welding defects became all inferior.

The content of O (oxygen) in the metal covering of each of the flux cored wires of Comparative Examples Nos. 25, 32, 33, 26 and 39 exceeded the upper limit of the range of the present invention so that there occurred spatters and evaluation results of the welding workability became inferior. In addition, the content of Si in the metal covering of the flux cored wires of Comparative Examples Nos. 29, 37 and 41 exceeded the upper limit of the range of the present invention so that the deterioration in the form of bead occurred and evaluation results of the welding workability became inferior.

What is claimed is:

1. In a flux cored wire for stainless steel which comprises a metal covering and flux enclosed by the metal covering, the improvement wherein the flux contains a slag forming agent in an amount of 6.0 wt. % to 13.0 wt. % based on the total weight of the wire and the metal covering is made of an austenite-base stainless steel containing 0.003 wt. % to 0.090 wt. % of O, 0.0005 wt. % to 0.02 wt. % of S, 0.1 wt. % to 0.6 wt. % of Si and 0.005 wt. % to 0.2 wt. % of V, each based on the total weight of the metal covering.

2. A flux cored wire for stainless steel according to claim 1, wherein the metal covering is made of an austenite-base stainless steel containing 0.005 wt. % to 0.090 wt. % of O, 0.0010 wt. % to 0.02 wt. % of S, 0.15 wt. % to 0.45 wt. % of Si and 0.010 wt. % to 0.1 wt. % of V.

3. A flux cored wire for stainless steel according to claim 1 or 2, wherein the total weight of N and Nb which are inevitable impurities contained in the metal covering is controlled to 0.2 wt. % or lower based on the total weight of the metal covering.

4. A flux cored wire for stainless steel according to any one of claims 1 or 2, wherein the slag forming agent is at least one compound selected from the group consisting of metal oxides, metal fluorides, carbonates and silicic acid compounds.

5. A flux cored wire for stainless steel according to claim 3, wherein the slag forming agent is at least one compound selected from the group consisting of metal oxides, metal fluorides, carbonates and silicic acid compounds.

* * * * *